United States Patent Office 2,982,662
Patented May 2, 1961

2,982,662

PROCESS OF PREPARING BATTERS ADAPTED FOR REFRIGERATED STORAGE

Walter M. Cochran, Highland Park, Reinhard E. Lutz, Deerfield, and Donald E. Miller, Oak Park, Ill., assignors to The Glidden Company, Cleveland, Ohio, a corporation of Ohio No Drawing. Filed July 10, 1957, Ser. No. 670,885

15 Claims. (Cl. 99—192)

This invention relates to the preparation of batters and doughs which can be stored at temperatures below about 45° F., or frozen, for moderately long periods of time without deteriorating in their ability to provide satisfactory baked products. The invention is characterized in part by using with shortening certain emulsifiers which are specifically needed to secure satisfactory baked products, and in part by using a novel process in preparing the batters and doughs.

This application is a continuation-in-part of our co-pending application Serial No. 613,381, filed October 2, 1956, and now abandoned.

Cake batters are usually prepared by following the steps listed below:

(1) All fat and a portion of sugar or flour are creamed together.

(2) A portion of the liquid and balance of dry ingredients are added and the mixture creamed again.

(3) Finally the balance of the liquid is added and the batter creamed until desired density and homogeneity are obtained.

If a batter prepared in this way is put into sealed containers and therein stored at 40° F. or so, or even frozen (in some instances) for a few days the cake obtained will be poor in quality when compared to the cake which results from the fresh, unstored batter. The cake volume will be low, the grain open, the cell structure irregular and cell walls heavy.

In investigating this deterioration of batters on storage, we found that the unsatisfactory performance appeared to be due to a collapse of the water and fat emulsion followed by an escape of the batter's entrapped air. We also observed that flour changes appeared to be responsible for the breaking of the emulsion. We postulated that the change which took place in the flour after the batter was completely hydrated was due to certain components of the flour continuing to imbibe water until a certain moisure-flour equilibrium had been reached. On this basis we sought methods for controlling this action, and the inventions described hereinafter were the outcome of our efforts.

Accordingly, one object of the invention is to provide batters and doughs which can be stored at refrigerator temperatures or frozen for long periods of time without deteriorating.

Another object is to provide a batter which has been homogenized and stabilized before it has been packaged for longtime storage at temperatures below about 45° F.

A further object is to provide a novel process for stabilizing batters which are to be stored at refrigerator temperatures or frozen.

Yet anothe object is to provide a novel emulsifier shortening product.

These and other objects will be understood more fully from the following description of our invention.

In the course of our efforts to stabilize prepared batters against deterioration which occurs during refrigerator or frozen storage, we found that if the batter is aged for several days a stable moisture-flour equilibrium is reached. We also found that if the aged batter is then aerated again, as by agitating it in a mixing vessel, it can be packaged and stored for long periods at refrigerator or freezer temperatures without losing its ability to bake a satisfactory product. We also found that best results are secured when the batter is initially prepared so as to be as nearly homogeneous as possible.

Briefly, our new process for preparing batters which are to be stored at temperatures below about 45° F. is as follows:

All ingredients, except any soda, are mixed together into a slurry and then the slurry is passed through a mechanical homogenizer of conventional construction. The resulting homogenized mass possesses a relative high specific gravity, being usually over 1.000. The homogenized mass is next allowed to age for several days (3–10 days) at refrigerator temperatures (38–45° F.) to allow the flour to absorb all the water it can hold. At the end of the aging period soda (if any) is added and the batter is aerated by beating with an electric mixer at high speed for several minutes until it has incorporated enough air to bring the specific gravity down to 0.8 and preferably to below 0.7. A beating period of 8–10 minutes is usually sufficient. The batter can then be packaged and stored under refrigeration or in a frozen condition. A batter prepared in the above manner will bake as good a cake after long storage as it would when fresh. No significant emulsion break-down occurs and the final cake possesses good volume, normal contour, and fine texture and grain.

In the procedure described briefly above, the soda (when used) is added last so that it will not be decomposed. If usual baking powders were used, they would react with soda at room temperature, thereby giving off the gases which should instead be generated when the batter is being baked. There are special acid leavening agents now available, however, such as dicalcium phosphate dihydrate which do not react with soda until the batter has reached a temperature of 160° F. Such delay leaveners are used in our batters. Thus, such soda as is used (if any) can be proportioned initially so as to provide whatever small amount is suitable for leavening action during the baking of the batter.

We have found that a batter made in the conventional way but using a delayed leavener cannot be refrigerated or in some cases even frozen successfully since some of the entrapped air is lost as a result of the changes which occur on storage as mentioned above, and since the remainder is driven off too early in the baking stage. The result is that the center of the cake is higher than the edges and the quality of the cake is otherwise inferior for the reasons already described above. We have also found, however, that certain emulsifiers aid materially in holding the air in the batter. The emulsifiers which can be used for this function include the glyceride esters described in U.S. Patents 2,480,332, 2,509,414 and 2,690,971, and like emulsifiers prepared with at least trihydroxy polyhydric alcohol(s) in place of or in combination with glycerine. The emulsifiers are reaction products having glycerine or other polyhydric alcohol partially to wholly esterified with both lower hydroxycarboxylic acid and fatty acids of 12–22 carbons and have been purified so as to be substantially free of water soluble materials produced in their preparation. Said purified reaction products can contain 0 to $n-2$ unesterified hydroxyl groups on some polyhydric alcohol radicals (where $n$ equals the number of hydroxyls of the polyhydric alcohol) by using between ½ and 2 mols of the hydroxycarboxylic acid with 1–2 mols of fatty acid per mol of alcohol in their preparation. When using glycerine as an example of polyhydric alcohol, the products have an average of at least 1.5 hydroxyls of the glycerine molecules esterified and may have an average of one hydroxyl of each molecule unesterified. The mixed lactic-fatty acid esters of glycerine or of other polyhydric alcohol(s) having at least 3 hydroxyls are preferred when they result from the use of polyhydric alcohol, lactic acid and palmitic and/or stearic acids in the approximate molar proportions of 1:1:1 (the single mol of fatty acids can be all palmitic, all stearic or mixtures of palmitic and stearic acids, but preferably contains at least 25% of palmitic acid). Where glycerine is the polyol, the reaction product has an average of one glyceryl hydroxyl of each glycerine molecule unesterified after being treated to remove water-solubles as by washing, steam distilling or deodorizing.

The ester(s) are advantageously used in an amount of about 5-15%, preferably 10% by weight, on the shortening. A shortening containing such amounts of the emulsifier(s) will yield batters of extraordinarily low specific gravities due to aeration of the batter. Moreover, all of the incorporated air is retained in the batter to properly leaven it during baking, thereby to produce a finished cake having a level surface.

It should be noted that by using the emulsifiers just described, one can incorporate more air than when conventional emulsifiers are used. This makes it possible to reduce the amount of or eliminate the soda and acid leavening.

Hydroxylated lecithin in amounts between about .1% and 1.0% by weight on the shortening can also be used advantageously along with the above-described emulsifiers. In our preferred recipes, where glycerine is used in preparing the emulsifiers, amounts of about .8% are employed. Hydroxylated lecithin is a known material, being described in U.S. Patent No. 2,629,662 which is here incorporated by reference.

The following examples illustrate the principles of our invention and represent the best modes presently known to us for practicing those principles.

EXAMPLE 1

A batter intended for packaging and refrigerator or freezer storage was prepared from the following ingredients:

| Ingredient: | Oz. |
|---|---|
| Cake flour | 95 |
| Sugar | 125 |
| Salt | 2 |
| Skim milk powder | 10 |
| Egg whites | 45 |
| Dicalcium phosphate dihydrate | 5.25 |
| Wheat starch | 5 |
| Water | 105 |
| Shortening [1] | 40 |
| Hydroxylated lecithin [2] (Glidden's HSD) | 0.34 |

[1] Contained about 10% of lacto-palmitate emulsifier corresponding to Example 2 of U.S. Patent No. 2,690,971.
[2] Corresponds to Example 1 of U.S. Patent 2,629,662.

*Procedure*

(1) The specified amount of tap water was weighed into a 20 quart Hobart bowl.

(2) To the water was added the skim milk powder. This was mixed with a hand whipper to dissolve and disperse the powder.

(3) The sugar and salt were added to the skim milk. This was stirred until sugar and salt were in solution.

(4) Dicalcium phosphate dihydrate and wheat starch were added and again the solution was stirred.

(5) The bowl was placed in the mixer and ingredients mixed with a paddle at low speed. The flour was added in four approximately equal portions. These portions were mixed until flour lumps disappeared.

(6) To 4 oz. of shortening was added 0.34 oz. of hydroxylated lecithin. These were mixed together.

(7) To another 20 qt. Hobart bowl was added 36 oz. of shortening and the 4 oz. of shortening containing hydroxylated lecithin. This was mixed with a paddle at high speed (speed 3) in the Hobart mixer.

(8) The water mixture was added slowly to the shortening with mixing at speed 1.

(9) The egg whites were added and the resulting mass was mixed for about one minute. The mixing was done carefully to prevent incorporation of air into the mass.

(10) The mixture was homogenized at 500–1000 pounds pressure and then placed in a refrigerator at 40° F. This premix was aged at 40° F. for 10 days.

(11) To the premix was then added 0.45% baking soda. The mix was then creamed for 5 minutes at medium speed (speed 2).

(12) A portion of the mix was canned and sealed and kept under refrigeration at approximately 40° F. for a period of 10 days.

(13) After this storage period, 410 g. of mix was weighed into each eight inch cake pan and baked at 350° F. for 24 minutes.

At the time of canning, the fresh batter qualities and the quality of the resulting baked cakes were secured from another portion of the mix and are summarized as follows:

| | |
|---|---|
| Temperature of batter | 52° F. |
| Specific gravity | 0.72. |
| Batter consistency | Smooth. |
| Cake volume | 1240. |
| Specific cake volume | 3.45 ml./g. |
| Cake texture | Close and even, almost fine. |

Batter and cake qualities of the same batter after 10 days of refrigeration storage were as follows:

| | |
|---|---|
| Temperature of batter | 44° F. |
| Specific gravity | .745. |
| Batter consistency | Smooth. |
| Cake volume | 1100. |
| Specific cake volume | 3.03 ml./g. |
| Cake texture | Close and even, almost fine. |

The above cakes were judged by experts to be the best ever seen by them. Similar results were secured when the emulsifier of the emulsified shortening corresponded to Example 1 or 2 of U.S. Patent No. 2,480,332.

EXAMPLE 2

Tests were arranged to show the benefits accruing to refrigerated or frozen batters by homogenizing the batter. The formula of Example 1 was used, but the ingredients were combined together in different ways. In premix A all of the ingredients except shortening and leavening were mixed together at room temperature. In premix B all the ingredients except the leavening were mixed together at room temperature and then were homogenized at 1000–500 pounds' pressure. Both premixes were aged 4 days at 40° F. The remaining necessary ingredients of the formula were then added and the batter was aerated by beating, and cakes were baked immediately from portions of the resulting batters. The results were as shown below:

| | Premix A | Premix B |
|---|---|---|
| Batter temperature | 72° F | 72° F. |
| Batter specific gravity | .60 | .62. |
| Batter texture | Smooth and slightly thick. | Smooth and slightly thick. |
| Cake volume | 1,190 | 1,300. |
| Specific cake volume | 3.02 ml./g | 3.30 ml./g. |
| Cake texture | Very close and even | Very close and even. |

Remaining portions of the finished, aerated batters were canned and stored 7 days at 40° F., were then removed from the refrigerated cans and allowed to stand at room temperature for 75 minutes before baking. The results were:

|  | Premix A | Premix B |
|---|---|---|
| Batter temperature | 53° F | 50° F. |
| Batter texture | Almost smooth | Almost smooth. |
| Batter specific gravity | .76 | .73. |
| Cake volume | 980 | 1,100. |
| Specific cake volume | 2.66 | 3.00. |

EXAMPLE 3

Batters were prepared by three different methods using the formula of Example 1.

(A) Regular bakery 4-stage mixing method.

(B) Homogenized batter prepared by the method of Example 1, but without intermediate aging.

(C) Homogenized batter prepared by the method of Example 1 but intermediately aged 7 days at 40° F. before being finished and stored.

Samples of all three mixes were subsequently stored 7 days at 40° F. and were compared with unstored batters and cakes secured therefrom at the time of canning the stored portions. Mix A was mixed for a total of 16 minutes while mixes B and C were mixed for 10 minutes. All mixing was done at medium speed (speed 2) using a 20 qt. Hobart mixer. The results secured from batter and baking tests were as follows:

shortening prepared from a 26.5° congeal oil mixture containing equal weights of cottonseed and soybean oils, with 5% (wt.) of added 20 IV cottonseed stearine.

(B) The resulting emulsified shortening was further modified by including therein 0.85% (wt.) of hydroxylated lecithin corresponding substantially to the product of Example 1 of U.S. Patent No. 2,629,662. This compounded shortening was then used in the recipe of Example 1 supra to prepare aged, aerated batter capable of being stored at temperatures below about 45° F. without deteriorating appreciably in baking quality. The preparation of the batters was as set forth above in Example 1.

The batters in these tests were aged for 7 days at 40° F. Then .45% (wt.) baking soda was added, and the batters were mixed at medium speed for 10 minutes. Portions of the batters were then baked into cakes while the remainder was canned and stored under refrigeration for 10 days and 17 days. Cakes were baked from these stored batters and the following tabulation permits a comparison of the results. For convenience, the batters made from the shortening of parts (A) and (B) above are designated mix A and mix B respectively.

BATTER

| Mix | Storage Period | Temp., °F. | Appearance | Sp. Gr. | Volume, ml. | Sp. Vol. | Texture |
|---|---|---|---|---|---|---|---|
| A | none | 55 | Smooth | 0.76 | 1,180 | 3.26 | Close and even. |
| B | do | 52 | do | 0.72 | 1,240 | 3.45 | Close and even (almost fine). |
| A | 10 days | 44 | do | 0.79 | 980 | 2.62 | Sl. Open and even. |
| B | do | 44 | do | 0.74 | 1,110 | 3.06 | Close and even (almost fine). |

It will be observed from these data that the hydroxylated lecithin improves the batter and cake qualities both before and after storage. It is apparent that the hydroxylated lecithin can be omitted, if desired, but better batters and cakes are obtained when it is present.

| Mix | Aging | Batter Texture | Batter Temp., °F. | Batter, Sp. Gr. | Cake Volume, ml. | Sp. Vol. | Remarks |
|---|---|---|---|---|---|---|---|
| A | None | Smooth and slick | 74 | .63 | 1,120 | 3.08 | Fine and even textured cake. |
| A | 7 days | Sl. Porous | 43 | .86 | 940 | 2.54 | Batter heavy and flat. Cake grain tight and sl. irreg. Irreg. crust color. Poor cake. |
| B | None | Smooth and sl. thick | 75 | .73 | 1,070 | 3.03 | Cake fine and even, round top. |
| B | 7 days | Almost smooth | 43 | .76 | 1,080 | 2.96 | Batter sl. creamy. Cake grain uniform, Sl. flat on top. Fair crust color. Fair cake. |
| C | None | Smooth and sl. creamy | 55 | .76 | 1,140 | 3.12 | Cake fine and even, Sl. peak. |
| C | 7 days | Smooth | 43 | .76 | 1,115 | 3.10 | Batter creamy. Cake grain excellent. Round top. Good crust color. Very good cake. |

The tests show that good cakes can be made from week old refrigerated batters by the method described briefly supra and illustrated in Example 1; that a satisfactory cake cannot be obtained from week old refrigerated batters made by the conventional bakery mix method, and that a satisfactory cake cannot be made with homogenized premixes unless the premix is allowed to age under refrigeration until the water-flour equilibrium has been attained.

EXAMPLE 4

(A) An emulsifier was prepared in accordance with U.S. Patent No. 2,480,332 from glycerine, lactic acid and palmitic acid in the molar ratios of 1:1.75:1. The washed emulsifier was added at a level of 10% to a plasticized

EXAMPLE 5

This example provides a comparison between conventional mono-, di-glyceride emulsifiers and a synergistic emulsifier combination composed of a lacto-palmitate emulsifier plus hydroxylated lecithin.

The shortening employed was a plasticized product prepared from a 26.5° congeal oil mixture containing equal weights of cottonseed and soybean oils, with 5% by weight of added 20 I.V. cottonseed stearine. A portion of this shortening was emulsified at a level of 8% by weight of conventional mono-, di-glyceride emulsifier to yield shortening C. The remainder of the shortening was emulsified at a level of 10% by weight with a lacto-palmitate emulsifier prepared in accordance with U.S.

Patent 2,690,971 using mole ratios of 1:1:1 between glycerine, lactic acid and palmitic acid, respectively, and was further modified by adding 0.85% by weight of the hydroxylated lecithin used in Example 4B. This combination of emulsifiers and shortening yielded shortening D.

Batters were prepared from these two shortenings by employing the recipe and preparation given in Example 1 supra, to yield mix C and mix D, respectively. Cakes were then baked in the manner described in Example 1. The following data provides a comparison of the results:

| Mix | Storage Period | Batter | | | Cake | |
|---|---|---|---|---|---|---|
| | | Temp., °F. | Appearance | Sp. Gr. | Volume | Texture |
| C | none | 46 | Smooth, very thin | 1.01 | 960 | Very close and even. |
| D | do | 46 | Smooth sl. fluffy | 0.60 | 1,180 | Do. |
| C | 10 days | 39 | Very thin | 1.01 | 930 | Irregular. |
| D | do | 39 | Smooth | 0.82 | 1,130 | Close and even. |
| C | 17 days | 38 | Very thin | 1.02 | 900 | Irregular and close. |
| D | do | 38 | Smooth | 0.82 | 1,120 | Close and even. |
| C | 32 days | Discarded because previous cake was unsatisfactory. | | | | |
| D | do | 38 | Smooth | 0.85 | 1,125 | Close and even. |

It can be seen from these data that shortening containing lacto-palmitate emulsifier is better for the preparation of refrigerated batters than shortenings containing mono-, di-glyceride type emulsifiers. However, the full potential of shortening containing lacto-palmitate emulsifier is best realized when hydroxylated lecithin is also present.

While the tests described in the foregoing examples have employed only refrigerator storage, substantially identical results are obtained in each instance with the hydroxy acid-fatty acid emulsifiers after freezer storage, as shown by the following example.

EXAMPLE 6

The shortening of Example 4A was employed in preparing a batter in the manner described in steps 1–11 of Example 1. Eight inch aluminum foil pans were then each filled with 14 oz. of the prepared batter. Two of the pans were covered and placed in a food freezer at approximately 0° F. Other pans were baked immediately under the conditions described in Example 1 to determine the fresh batter qualities. After 8 weeks in the freezer, the first two pans were removed and placed directly into an oven where they were baked into cakes. Since these batters were frozen when placed in the oven, no information could be secured in respect to batter texture or specific gravity but the following data secured from the tests provides a direct comparison of cake volume and texture.

FRESH BATTER TEST

Batter temperature _____ 52° F.
Batter specific gravity _____ 0.72.
Batter texture _____ Smooth.
Cake volume _____ 1240 ml.
Cake texture _____ Close and even.

FROZEN BATTER TEST

Batter temperature _____ 4° F.
Cake volume _____ 1215 ml.
Cake texture _____ Close and even.

EXAMPLES 7, 8 AND 9

*Preparation of sorbitol lacto-palmitate emulsifier; emulsifier E*

The following components were heated together in a 500 ml. flask fitted with carbon dioxide inlet tube and thermometer:

130 g. palmitic acid (.5 mole)
45 g. lactic acid (85%) (.425 mole)
130 g. of 70% sorbitol solution (.5 mole)

The mixture was heated for 5½ hours at 200–210° C., while water vapor was slowly removed by a stream of carbon dioxide. After washing the product four times with 3% sodium sulfate solution, it was dried under vacuum, and clarified by filtration. The cooled product was a tan waxy solid, weighing 187 g. and having an acid value of 12. The resulting emulsifier is described and claimed in copending application Serial No. 759,420, filed September 8, 1958.

*Preparation of sorbitol lacto-palmitate emulsifier; emulsifier F*

In a similar manner to that described above, a mixture of 194 g. palmitic acid (.75 mole)
159 g. lactic acid (85%) (1.50 mole)
195 g. of 70% sorbitol solution (.75 mole)

was heated together for one hour at 185° C., and then for 5¼ hours at 200° C. The final emulsifier was 320 g. of tan waxy solid, having an acid value of 13.6. The resulting emulsifier is described and claimed in the copending application Serial No. 759,420, filed September 8, 1958.

These emulsifiers were then separately blended with shortening in the proportions shown below, and the emulsified shortenings were tested for performance in relation to frozen or refrigerated batters. The results are shown below:

| Shortening Used | Fresh Batter | | Cakes from Batters | |
|---|---|---|---|---|
| | Appearance | Sp. Gr. | Volume | Texture |
| Example 7: 90% Commercial hydrogenated non-emulsified bakery shortening. 10% Sorbitol Emulsifier E | Very slick and fluid | .660 | Average+ | Al. fine and even. High sides and flat top. |
| Example 8: 90% Same shortening as in Example 7. 10% Sorbitol Emulsifier F | Smooth and very thick | .507 | Average++ | Fine and even. High sides and al. flat. |
| Example 9: Same as Example 8 with 50% leavening omitted. | Smooth and thick | .570 | Average++ | Fine and even. Mod. round top. |

From the foregoing detailed description of our invention it will be clear that the invention rests primarily on our discovery of the benefits afforded by homogenizing and then aging a prepared batter prior to storage. Operational details attending satisfactory utilization of this discovery reside in the use of known emulsifiers of the types described hereinabove and in the use of the known dicalcium phosphate dihydrate leavening agent. An optional detail is the use of soda to assist in the leavening, but an operational requirement affecting satisfactory utilization of the discovery involves omitting any soda until just prior to packaging the completed batter, so that the benefits of such soda may not be lost. These aspects hence constitute the basis for the inventions defined in the following claims. Preferences which have already been expressed hereinabove constitute the basis for variants in the defined inventions. Other variants within the skill of the art and within the scope of the defined inventions will be apparent. Thus while homogenization of the partly prepared batter has been illustrated as being accomplished through the medium of a pressure homogenizer of known and conventional construction, other devices producing homogenization can be used equally well. Furthermore, while the inventions have been illustrated in connection with certain recipes for baked products and in connection with particular identified shortenings, the inventions can be practiced successfully with other recipes and/or other shortenings of conventional types. Furthermore, it will be apparent that the inventions can be practiced successfully without confining the prepared batters to just refrigerator storage or to just freezer storage. That is, if it is expedient to freeze the packaged batters during a part of their storage period and then to store them under refrigeration or vice versa, such storage variants can be practiced in accordance with one's needs or desires as long as the batters are not heated during the storage period to temperatures above about 45° F. Thus, the inventions can be practiced successfully under such practical conditions as may arise in a nation-wide distribution of the prepared batters in the usual channels employed for such widespread distribution of perishable food products.

Having described our invention, what we claim is:

1. The method of preparing a batter which is adapted to be stored at temperatures below about 45° F. without significant deterioration in its abilitly to provide a satisfactory baked product after storage, which method comprises the steps of: providing the wet and dry ingredients of a recipe for baked products, said ingredients including flour, aqueous liquid, dicalcium phosphate dihydrate as the sole acidic leavening agent, if any is used, and shortening which contains 5–15% of an emulsifier which is a lower hydroxycarboxylic acid-fatty acid ester of an edible polyhydric alcohol having 3–6 hydroxyl groups, said ester (a) having between ½ and 2 mols of lower hydroxy-carboxylic acid and at least 1 mol of fatty acid of 12–22 carbons esterified per mol of polyhydric alcohol, (b) having at least an average of 1.5 hydroxyls per molecule of polyhydric alcohol esterified, and (c) having been treated to remove water-soluble materials; mixing together all of the wet and dry ingredients of the batter except soda, if any is used; homogenizing said mixture; then aging said homogenized mixture under refrigeration at temperatures between about 38° and 45° F. for a period of at least 3 days; then adding the soda, if any, desired for leavening and mixing the resulting batter under aerating conditions to produce an aerated batter having a specific gravity below about 0.8; packaging the aerated batter and storing said packaged batter at temperatures below about 45° F. until it is to be used to prepare a baked product.

2. The method as claimed in claim 1 where the polyhydric alcohol of said emulsifier is sorbitol.

3. The method as claimed in claim 2 wherein the lower hydroxycarboxylic acid of the emulsifier is lactic acid.

4. The method as claimed in claim 3 wherein the fatty acids of said emulsifier are composed of at least 25% by weight of palmitic acid, and wherein the shortening contains between about 0.1% and 1.0% of hydroxlated lecithin by weight.

5. The method of preparing a batter which is adapted to be stored at temperatures below about 45° F. without significant deterioration in its ability to provide a satisfactory baked product after storage, which method comprises the steps of: providing the wet and dry ingredients of a recipe for baked products, said ingredients including flour, aqueous liquid, dicalcium phosphate dihydrate as the sole acidic leavening agent, if any is used, and shortening which contains 5–15% of an emulsifier which is a lower hydroxycarboxylic acid-fatty acid glyceride, said ester (a) having between ½ and 2 mols of lower hydroxycarboxylic acid and at least 1 mol of fatty acid of 12–22 carbons esterfied per mol of glycerine, (b) having at least an average of 1.5 hydroxyls per glycerine molecule esterified, and (c) having been treated to remove water-soluble materials; mixing together all of the wet and dry ingredients of the batter except soda, if any is used; homogenizing said mixture; then aging said homogenized mixture under refrigeration at temperatures between about 38° and 45° F. for a period of at least 3 days; then adding the soda, if any, desired for leavening and mixing the resulting batter under aerating conditions to produce an aerated batter having a specific gravity below about 0.8; packaging the aerated batter and storing said packaged batter at temperatures below about 45° F. until it is to be used to prepare a baked product.

6. The method as claimed in claim 5 wherein the lower hydroxycarboxylic acid of the emulsifier is lactic acid.

7. The method as claimed in claim 6 wherein the fatty acids of said emulsifier are composed of at least 25% by weight of palmitic acid.

8. The method as claimed in claim 6 wherein the said lower hydroxy acid-fatty acid glyceride, after having been freed of water-soluble materials, has an average of one unesterfied glyceryl hydoxyl per mol of glycerine.

9. The method as claimed in claim 8 wherein the specific gravity of the aerated batter prior to packaging is below about 0.7.

10. The method as claimed in claim 9 wherein the shortening used as an ingredient of said batter contains between about 0.1% and 1.0% of hydroxylated lecithin by weight.

11. The method as claimed in claim 10 wherein the hydroxlated lecithin amounts to about 0.8% by weight.

12. The method as claimed in claim 11 wherein the shortening contains about 10% by weight of said hydroxy acid-fatty acid glyceride emulsifier.

13. The method as claimed in claim 10 wherein the shortening contains about 10% by weight of said hydroxy acid-fatty acid glyceride emulsifier.

14. The method as claimed in claim 5 wherein the shortening contains about 10% by weight of said hydroxy acid-fatty acid glyceride emulsifier.

15. The method as claimed in claim 5 wherein the fatty acids of said emulsifier are composed of at least 25% by weight of palmitic acid.

References Cited in the file of this patent

UNITED STATES PATENTS

| | | |
|---|---|---|
| 2,509,414 | Barsky | May 30, 1950 |
| 2,524,437 | Garnatz et al. | Oct. 3, 1950 |
| 2,629,662 | Jullian | Feb. 24, 1953 |
| 2,688,551 | Graham | Sept. 7, 1954 |
| 2,690,971 | Iveson et al. | Oct. 5, 1954 |
| 2,773,771 | Jullian et al. | Dec. 11, 1956 |
| 2,810,650 | Joslin | Oct. 22, 1957 |

OTHER REFERENCES

Food Research, March-April 1950, pages 169–178 (pages 169, 170, 178 relied on).